United States Patent
Kim et al.

(10) Patent No.: US 10,665,879 B2
(45) Date of Patent: May 26, 2020

(54) SOLID OXIDE FUEL CELL

(71) Applicant: LG CHEM, LTD., Seoul (KR)

(72) Inventors: Jong Woo Kim, Daejeon (KR); Changseok Ryoo, Daejeon (KR); Kwangwook Choi, Daejeon (KR); Jongjin Lee, Daejeon (KR); Jeong Mi Choi, Daejeon (KR); Bu Won Son, Daejeon (KR); Doohyun Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/099,354

(22) PCT Filed: Aug. 24, 2017

(86) PCT No.: PCT/KR2017/009261
§ 371 (c)(1),
(2) Date: Nov. 6, 2018

(87) PCT Pub. No.: WO2018/062693
PCT Pub. Date: Apr. 5, 2018

(65) Prior Publication Data
US 2019/0214667 A1    Jul. 11, 2019

(30) Foreign Application Priority Data
Sep. 30, 2016  (KR) .................. 10-2016-0126712

(51) Int. Cl.
| | | |
|---|---|---|
| *H01M 8/1226* | (2016.01) | |
| *H01M 8/126* | (2016.01) | |
| *H01M 8/2425* | (2016.01) | |
| *H01M 4/86* | (2006.01) | |

(Continued)

(52) U.S. Cl.
CPC ......... *H01M 8/1226* (2013.01); *H01M 4/861* (2013.01); *H01M 4/8657* (2013.01); *H01M 8/126* (2013.01); *H01M 8/1213* (2013.01); *H01M 8/2425* (2013.01); *H01M 2008/1293* (2013.01); *Y02E 60/525* (2013.01); *Y02P 70/56* (2015.11)

(58) Field of Classification Search
CPC ............................ H01M 4/861; H01M 8/1226
USPC ....................................................... 429/465
See application file for complete search history.

(56) References Cited

U.S. PATENT DOCUMENTS

| | | |
|---|---|---|
| 6,399,234 B2 | 6/2002 | Bonk et al. |
| 7,754,365 B2 | 7/2010 | Fukushima et al. |
| 9,318,766 B2 | 4/2016 | Kim et al. |

(Continued)

FOREIGN PATENT DOCUMENTS

| | | |
|---|---|---|
| JP | 2012-54137 A | 3/2012 |
| JP | 5205731 B2 | 6/2013 |

(Continued)

OTHER PUBLICATIONS

Extended European Search Report dated Mar. 28, 2019, for European Patent Application No. 17856579.2.

(Continued)

*Primary Examiner* — James M Erwin
(74) *Attorney, Agent, or Firm* — Birch, Stewart, Kolasch & Birch, LLP

(57) ABSTRACT

The present specification relates to a solid oxide fuel cell including an anode, a cathode, and an electrolyte layer provided between the anode and the cathode and a method for fabricating the solid oxide fuel cell.

6 Claims, 5 Drawing Sheets

(51) Int. Cl.
   *H01M 8/1213*   (2016.01)
   *H01M 8/124*    (2016.01)

(56) References Cited

U.S. PATENT DOCUMENTS

| | | |
|---|---|---|
| 2007/0077476 A1 | 4/2007 | Lee et al. |
| 2008/0096090 A1 | 4/2008 | Cipollini et al. |
| 2011/0177424 A1 | 7/2011 | Goto |
| 2012/0251917 A1 | 10/2012 | Son et al. |
| 2013/0052562 A1 | 2/2013 | Yoon |
| 2014/0141358 A1 | 5/2014 | Son et al. |
| 2017/0237103 A1 | 8/2017 | Choi et al. |

FOREIGN PATENT DOCUMENTS

| | | |
|---|---|---|
| JP | 5274037 B2 | 8/2013 |
| JP | 2014-89816 A | 5/2014 |
| JP | 2015-201311 A | 11/2015 |
| KR | 10-2001-0104645 A | 11/2001 |
| KR | 10-2007-0037254 A | 4/2007 |
| KR | 10-2007-0095330 A | 9/2007 |
| KR | 10-2011-0004274 A | 1/2011 |
| KR | 10-1272036 B1 | 6/2013 |
| KR | 10-1274809 B1 | 6/2013 |
| KR | 10-2014-0065923 A | 5/2014 |
| KR | 10-2014-0085431 A | 7/2014 |
| KR | 10-2015-0039586 A | 4/2015 |
| KR | 10-2016-0059419 A | 5/2016 |
| WO | WO 2014/122807 A1 | 8/2014 |

OTHER PUBLICATIONS

International Search Report for PCT/KR2017/009261 (PCT/ISA/210) dated Nov. 30, 2017.

[Figure 1]
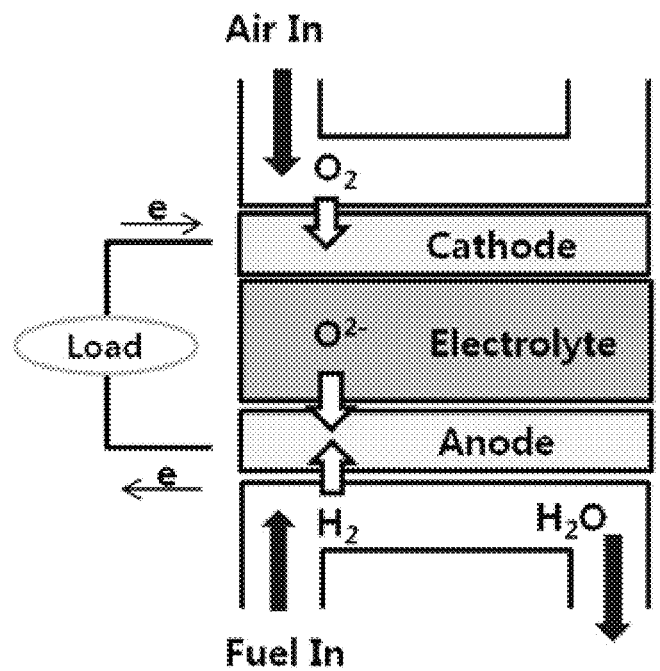
[Figure 2]
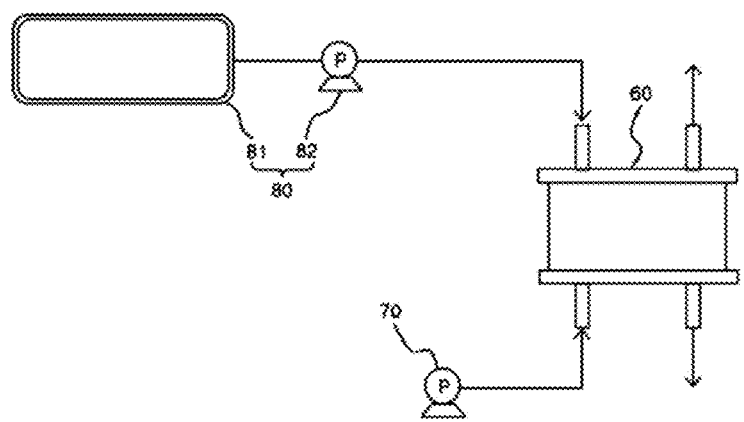

[Figure 3]
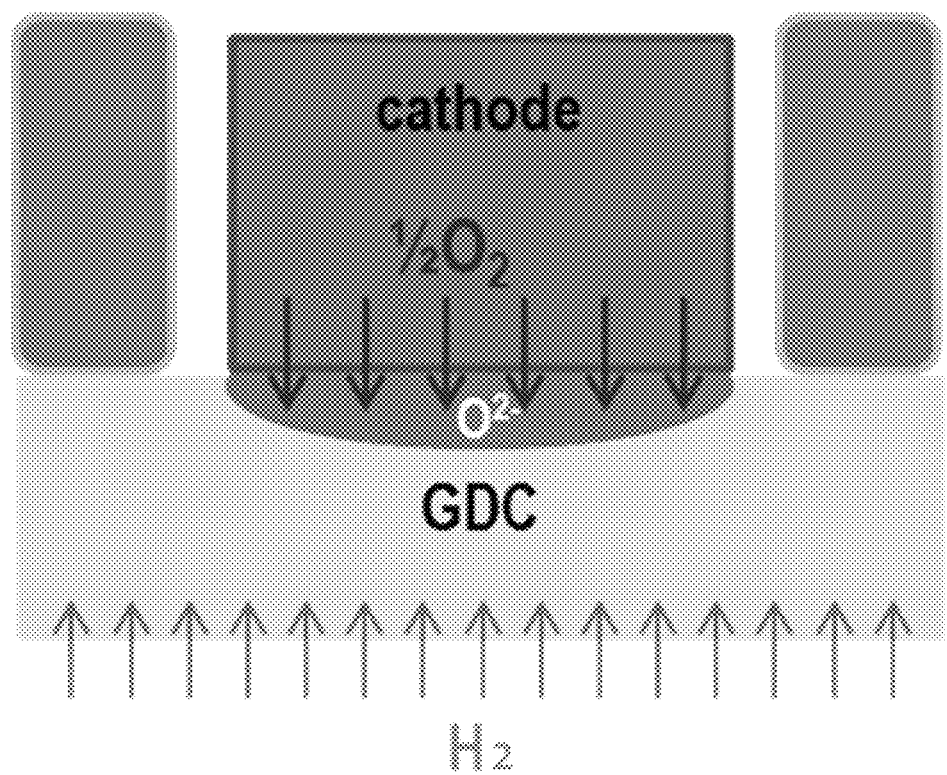

[Figure 4]
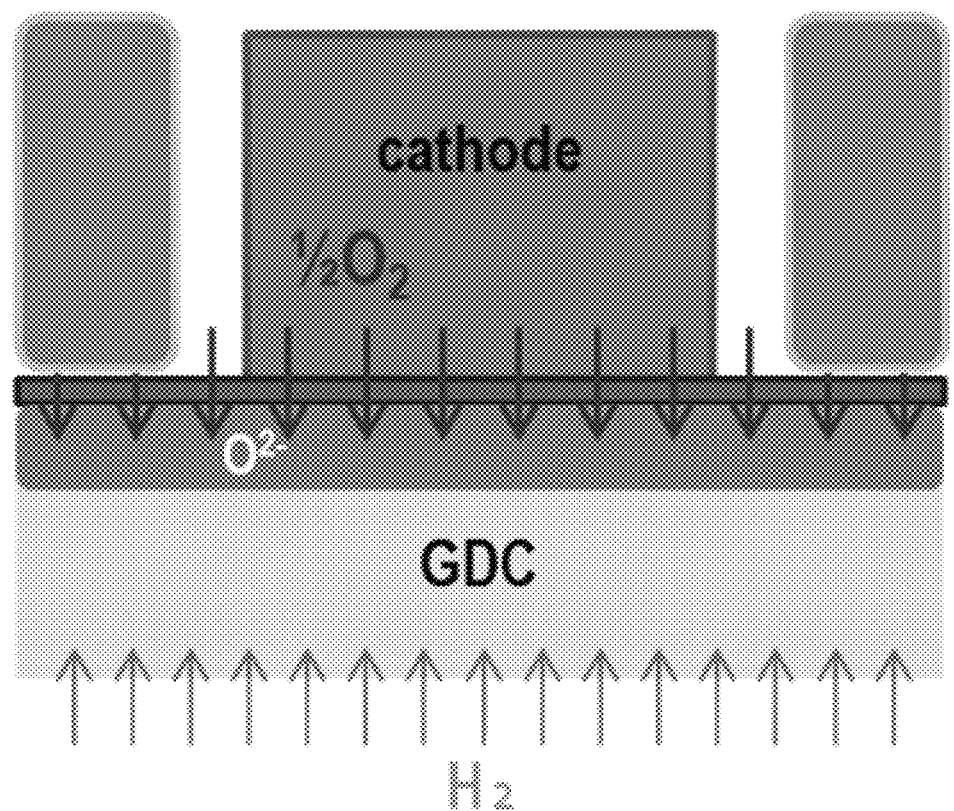

[Figure 5]
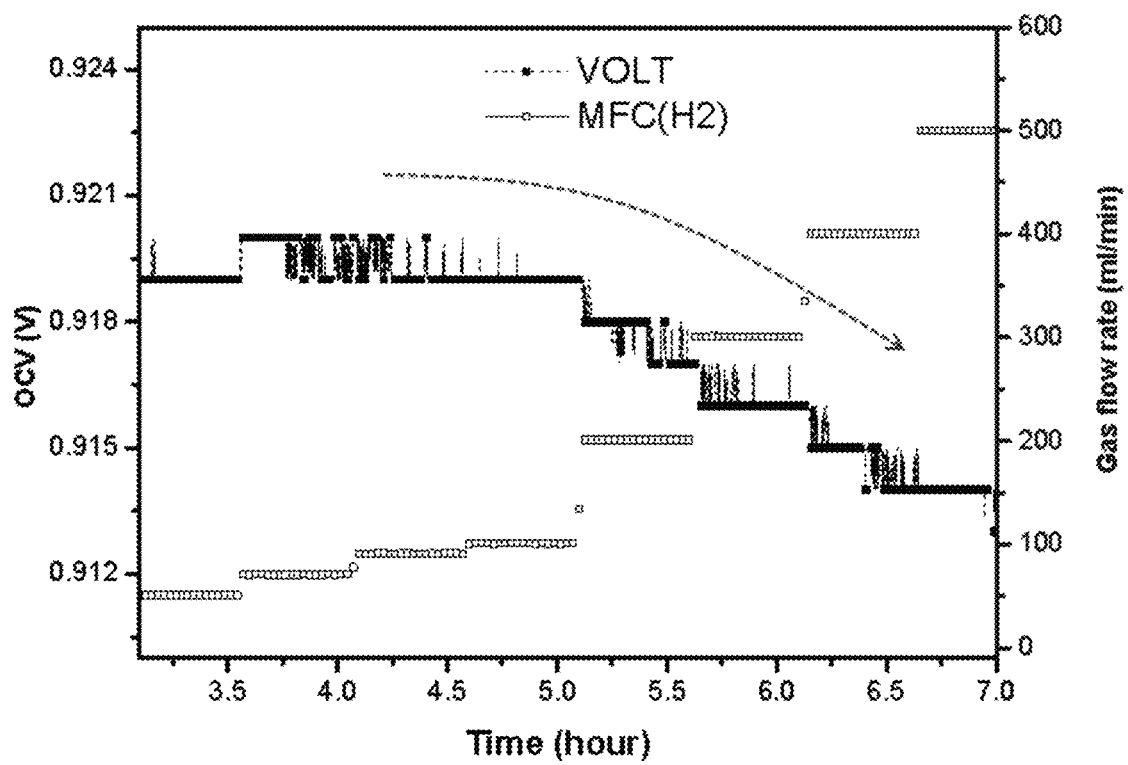

[Figure 6]
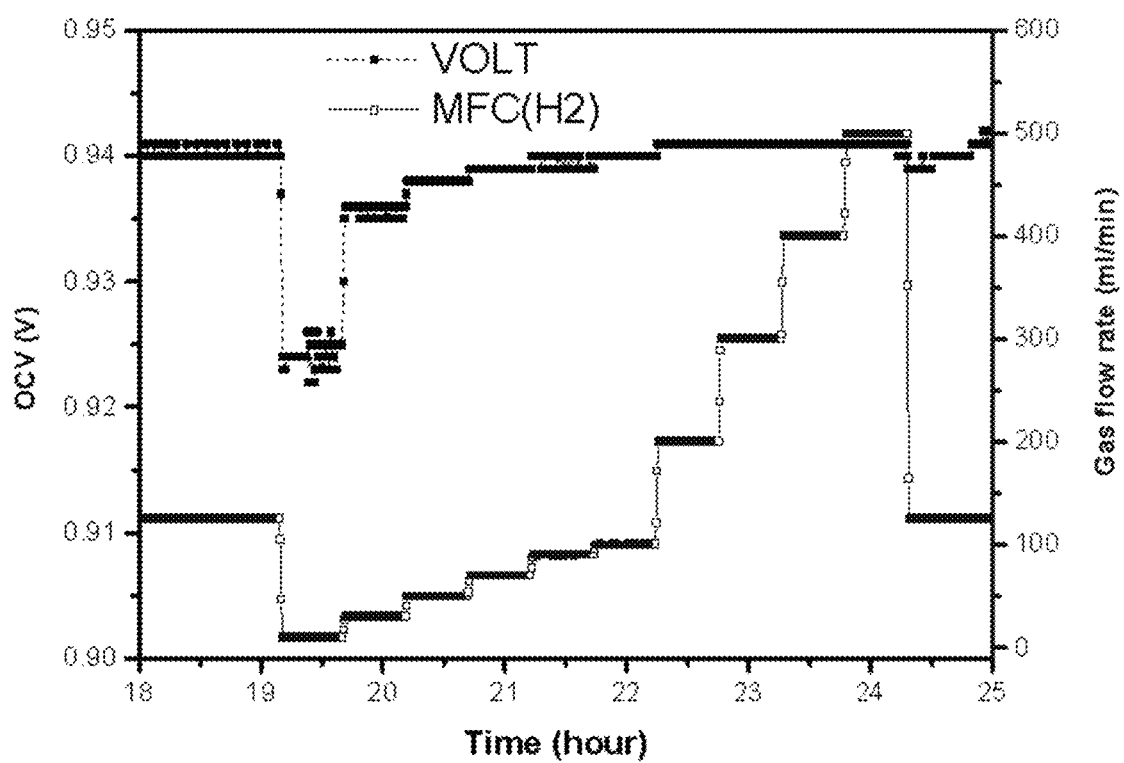

SOLID OXIDE FUEL CELL

TECHNICAL FIELD

This application claims priority to and the benefit of Korean Patent Application No. 10-2016-0126712 filed in the Korean Intellectual Property Office on Sep. 30, 2016, the entire contents of which are incorporated herein by reference.

The present specification relates to a solid oxide fuel cell including an anode, a cathode, and an electrolyte layer between the anode and the cathode and a method for fabricating the solid oxide fuel cell.

BACKGROUND ART

Recently, depletion of existing energy sources such as oil and coal has been predicted, and interest in energy that can replace the energy is increasing. A fuel cell as one of the alternative energy has particularly received attention due to high efficiency and merits such that pollutants such as NOx and SOx are not discharged and the used fuel is abundant.

The fuel cell is a power generation system that converts chemical reaction energy of the fuel and an oxidizer into electric energy, and hydrogen and hydrocarbons such as methanol and butane as the fuel and oxygen as the oxidizer are representatively used.

The fuel cell includes a polymer electrolyte membrane fuel cell (PEMFC), a direct methanol fuel cell (DMFC), a phosphoric acid fuel cell (PAFC), an alkaline fuel cell (AFC), a molten carbonate fuel cell (MCFC), a solid oxide fuel cell (SOFC), and the like.

Meanwhile, research on a metal air secondary battery that manufactures a cathode of the metal secondary battery as an air electrode by applying a principle of the air electrode of the fuel cell is required.

DETAILED DESCRIPTION OF THE INVENTION

Technical Problem

The present specification has been made in an effort to provide a solid oxide fuel cell including an anode, a cathode, and an electrolyte layer between the anode and the cathode and a method for fabricating the solid oxide fuel cell.

Technical Solution

An exemplary embodiment of the present specification provides an anode support type solid oxide fuel cell in which an anode support, an anode functional layer, an electrolyte, and a cathode are sequentially provided, in which the electrolyte includes ceria-based metal oxide, the cathode includes a cathode thin film layer provided on the electrolyte and a cathode thick film layer provided on the cathode thin film layer, the thickness of the cathode thin film layer is less than 50 nm, the porosity of the cathode thin film layer is 1% or less, the thickness of the cathode thick film layer is 20 µm or more and 40 µm or less, the porosity of the cathode thick film layer is 30% or more, a contact area between the electrolyte and the cathode thin film layer is 100% based on the entire area of one side facing the cathode thin film layer of the surface of the electrolyte, and a contact area between the cathode thin film layer and the cathode thick film layer is about 80% or more and 97% or less based on the entire area of one side facing the cathode thick film layer of the surface of the cathode thin film layer.

Another exemplary embodiment of the present specification provides a battery module including the solid oxide fuel cell as a unit cell.

Advantageous Effects

According to the exemplary embodiment of the present specification, the electrolyte including ceria-based metal oxide can improve reduction durability for hydrogen.

BRIEF DESCRIPTION OF DRAWINGS

FIG. 1 is a schematic diagram illustrating an electricity generation principle of a solid oxide fuel cell.

FIG. 2 is a diagram schematically illustrating an example of a cell module including a fuel cell.

FIG. 3 illustrates a structure of a fuel cell in Comparative Example.

FIG. 4 illustrates a structure of a fuel cell according to an exemplary embodiment of the present specification.

FIG. 5 is a graph obtained by measuring OCV according to an increase in hydrogen flow rate of a battery cell using the fuel cell in Comparative Example.

FIG. 6 is a graph obtained by measuring OCV according to an increase in hydrogen flow rate of a battery cell using the fuel cell in Example.

BEST MODE

Hereinafter, the present specification will be described in detail.

The present specification provides an anode support type solid oxide fuel cell in which an anode support, an anode functional layer, an electrolyte, and a cathode are sequentially provided.

FIG. 1 schematically illustrates an electricity generation principle of a solid oxide fuel cell. The solid oxide fuel cell includes an electrolyte layer and a fuel electrode (anode) and an air electrode (cathode) formed on both surfaces of the electrolyte layer. Referring to FIG. 1 illustrating the principle of electricity generation of the solid oxide fuel cell, air is electrochemically reduced at the cathode to generate oxygen ions, and the produced oxygen ions are transferred to the anode through the electrolyte layer. In the anode, fuel such as hydrogen, methanol, butane and the like is injected and the fuel is combined with the oxygen ions and electrochemically oxidized to emit electrons and generate water. This reaction causes electron transfer to an external circuit.

The electrolyte may include ceria-based metal oxide.

The ceria-based metal oxide is not particularly limited as long as having oxygen ion conductivity, but particularly, the ceria-based metal oxide may include at least one of samarium doped ceria and gadolinium doped ceria, and more particularly may include gadolinium doped ceria.

A thickness of the electrolyte may be 10 µm or more and 100 µm or less. Particularly, the thickness of the electrolyte may be 20 µm or more and 50 µm or less.

The method for preparing the electrolyte is not particularly limited, but for example, an electrolyte may be fabricated by coating electrolyte slurry and drying and firing the coated electrolyte slurry; or forming an electrolyte green sheet by coating and drying the electrolyte slurry on a separate release sheet, and one or more electrolyte green sheets may be fired alone or with a green sheet of adjacent heterogeneous layers to prepare an electrolyte.

A thickness of the electrolyte green sheet may be 10 μm or more and 100 μm or less.

The electrolyte slurry includes ceria-based metal oxide particles, and if necessary, the electrolyte slurry may further include at least one of a binder resin, a plasticizer, a dispersant, and a solvent. The binder resin, the plasticizer, the dispersant and the solvent are not particularly limited, and typical materials known in the art can be used.

Based on the total weight of the electrolyte slurry, the content of the ceria-based metal oxide particles may be 40 wt % or more and 70 wt % or less.

Based on the total weight of the electrolyte slurry, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The cathode may include a cathode thin film layer provided on the electrolyte and a cathode thick film layer provided on the cathode thin film layer.

The cathode thin film layer and the cathode thick film layer may each independently include an inorganic material having oxygen ion conductivity. The kind of inorganic material is not particularly limited, but the inorganic material may include at least one of yttria stabilized zirconia (YSZ; $(Y_2O_3)_x(ZrO_2)_{1-x}$, x=0.05 to 0.15), scandia stabilized zirconia (ScSZ; $(Sc_2O_3)_x(ZrO_2)_{1-x}$, x=0.05 to 0.15), samarium doped ceria (SDC; $(Sm_2O_3)_x(CeO_2)_{1-x}$, x=0.02 to 0.4), gadolinium doped ceria (GDC; $(Gd_2O_3)_x(CeO_2)_{1-x}$, x=0.02 to 0.4), lanthanum strontium manganese oxide (LSM), lanthanum strontium cobalt ferrite (LSCF) lanthanum strontium nickel ferrite (LSNF), lanthanum calcium nickel ferrite (LCNF), lanthanum strontium cobalt oxide (LSC), gadolinium strontium cobalt oxide (GSC), lanthanum strontium ferrite (LSF), samarium strontium cobalt oxide (SSC), barium strontium cobalt ferrite (BSCF), and lanthanum strontium gallium magnesium oxide (LSGM).

A thickness of the cathode thin film layer may be less than 50 nm, particularly 10 nm or more and less than 50 nm, and more particularly 10 nm or more and 30 nm or less. In this case, there is an advantage in that the resistance when the oxygen ions move to the electrolyte can be minimized.

The porosity of the cathode thin film layer may be 1% or less, particularly 0% or more and 1% or less, more particularly 0% or more and 0.1% or less. The cathode thin film layer is dense to prevent leakage of fuel and air.

A contact area between the electrolyte and the cathode thin film layer may be about 100% based on the entire area of one side facing the cathode thin film layer on the surface of the electrolyte. At this time, there may be some errors in the process, but theoretically, a contact area between the electrolyte and the cathode thin film layer may be 100% based on the entire area of one side facing the cathode thin film layer on the surface of the electrolyte.

The cathode thin film layer may contact the entire area of one side facing the cathode thin film layer on the surface of the electrolyte including the ceria-based metal oxide, thereby increasing the area of the electrolyte and the cathode. In this case, oxygen ions ($O^{2-}$) may be injected into a larger area of the electrolyte, and the oxygen ions injected from the cathode side oxidize the electrolyte to reduce the area reduced from the anode side where hydrogen is supplied, thereby improving reduction durability for hydrogen.

The method for preparing the cathode thin film layer is not particularly limited, but for example, a cathode thin film layer may be fabricated by coating slurry for the cathode thin film layer on the electrolyte layer and drying and firing the coated slurry for the cathode thin film layer; or forming a green sheet for a cathode thin film layer by coating and drying the slurry for the cathode thin film layer on a separate release sheet, and one or more green sheets for the cathode thin film layer may be fired alone or with a green sheet of adjacent heterogeneous layers to prepare a cathode thin film layer.

In the case of coating the slurry for the cathode thin film layer on the adjacent layer, the coating method is not particularly limited and for example, may include sputtering, spin-coating, and the like.

The slurry for the cathode thin film layer includes inorganic particles having oxygen ion conductivity, and if necessary, the slurry for the cathode thin film layer may further include at least one of a binder resin, a plasticizer, a dispersant, and a solvent. The binder resin, the plasticizer, the dispersant and the solvent are not particularly limited, and typical materials known in the art can be used.

Based on the total weight of the slurry for the cathode thin film layer, the content of the inorganic particle having oxygen ion conductivity may be 40 wt % or more and 70 wt % or less, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The thickness of the cathode thick film layer may be 20 μm or more and 40 μm or less, particularly 20 μm or more and 30 μm or less, and more particularly 25 μm or more and 30 μm or less.

The porosity of the cathode thick film layer may be 30% or more and particularly 30% or more and 50% or less.

A contact area between the cathode thin film layer and the cathode thick film layer may be about 80% or more and 97% or less based on the entire area of one side facing the cathode thick film layer of the surface of the cathode thin film layer.

The method for preparing the cathode thick film layer is not particularly limited, but for example, a cathode thick film layer may be fabricated by coating slurry for the cathode thick film layer on the cathode thin film layer and drying and firing the coated slurry for the cathode thick film layer; or forming a green sheet for a cathode thick film layer by coating and drying the slurry for the cathode thick film layer on a separate release sheet, and one or more green sheets for the cathode thick film layer may be fired alone or with a green sheet of adjacent heterogeneous layers to prepare the cathode thick film layer.

In the case of coating the slurry for the cathode thick film layer on the cathode thin film layer, the coating method is not particularly limited and for example, may include sputtering, spin-coating, and the like.

In order to prepare the cathode thin film layer and the cathode thick film layer to have different porosities, the cathode thin film layer and the cathode thick film layer may be formed by adjusting the composition or the content of the slurry for forming the cathode thin film layer and the cathode thick film layer, or differently adjusting the method of forming the formed coating film or sintering conditions. Particularly, each of the coating films formed to prepare the cathode thin film layer and the cathode thick film layer may be independently sintered, and prepared by differently adjusting the sintering conditions so that the porosities of the cathode thin film layer and the cathode thick film layer may be different from each other. More particularly, the coating film for the cathode thin film layer is formed on the electrolyte and sintered under a condition for forming a dense layer, and the coating film for the cathode thick film layer is formed on the sintered cathode thin film layer and sintered under a condition for forming a porous layer.

The slurry for the cathode thick film layer includes inorganic particles having oxygen ion conductivity, and if necessary, the slurry for the cathode thick film layer may further include at least one of a binder resin, a plasticizer, a dispersant, and a solvent. The binder resin, the plasticizer, the dispersant and the solvent are not particularly limited, and typical materials known in the art may be used.

Based on the total weight of the slurry for the cathode thick film layer, the content of the inorganic particle having oxygen ion conductivity may be 40 wt % or more and 70 wt % or less, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The anode may include an inorganic material having oxygen ion conductivity so as to be applicable to the anode for the solid oxide fuel cell. The kind of organic material is not particularly limited, but the inorganic material may include at least one of yttria stabilized zirconia (YSZ: $(Y_2O_3)_x(ZrO_2)_{1-x}$, x=0.05 to 0.15), scandia stabilized zirconia (ScSZ: $(Sc_2O_3)_x(ZrO_2)_{1-x}$, x=0.05 to 0.15)), samarium doped ceria (SDC: $(Sm_2O_3)_x(CeO_2)_{1-x}$, x=0.02 to 0.4), and gadolinium doped ceria (GDC: $(Gd_2O_3)_x(CeO_2)_{1-x}$, x=0.02 to 0.4).

The anode may include the same inorganic material as the metal oxide of the electrolyte. Particularly, when the electrolyte includes ceria-based metal oxide, the anode may include the ceria-based metal oxide. More particularly, when the electrolyte includes gadolinium doped ceria, the anode may include the gadolinium doped ceria.

A thickness of the anode may be 300 μm or more and 800 μm or less. Particularly, the thickness of the anode may be 500 μm or more and 700 μm or less.

The porosity of the anode may be 10% or more and 50% or less. Particularly, the porosity of the anode may be 10% or more and 30% or less.

A diameter of a pore of the anode may be 0.1 μm or more and 10 μm or less. Particularly, the diameter of the pore of the anode may be 0.5 μm or more and 5 μm or less. More particularly, the diameter of the pore of the anode may be 0.5 μm or more and 2 μm or less.

The method for preparing the anode is not particularly limited, but for example, a anode may be fabricated by coating anode slurry and drying and firing the coated slurry for the anode; or forming a green sheet for the anode by coating and drying the anode slurry on a separate release sheet, and one or more green sheets for the anode may be fired alone or with a green sheet of adjacent heterogeneous layers to prepare the anode.

A thickness of the green sheet for the anode may be 500 μm or more and 1000 μm or less.

The anode slurry includes inorganic particles having oxygen ion conductivity, and if necessary, the anode slurry may further include at least one of a binder resin, a plasticizer, a dispersant, and a solvent. The binder resin, the plasticizer, the dispersant and the solvent are not particularly limited, and typical materials known in the art can be used.

Based on the total weight of the anode slurry, the content of the inorganic particle having oxygen ion conductivity may be 10 wt % or more and 40 wt % or less, the content of the solvent may be 10 wt % or more and 30 wt % or less, the content of the dispersant may be 5 wt % or more and 10 wt % or less, the content of the plasticizer may be 0.5 wt % or more and 3 wt % or less, and the content of the binder may be 10 wt % or more and 30 wt % or less.

The anode slurry may further include NiO. The content of the NiO may be 30 wt % or more and 60 wt % or less based on the total weight of the anode slurry.

The anode may include an anode support and an anode functional layer. At this time, the anode support is a layer containing the same inorganic material as the anode functional layer, but supporting another layer due to higher porosity and a relatively larger thickness than the anode functional layer. The anode functional layer may be a layer which is provided between the anode support and the electrolyte layer to actually play a main role as the anode.

When the anode includes the anode support and the anode functional layer, the anode may be prepared by laminating a green sheet for the prepared anode functional layer on the fired anode support and then firing the laminated green sheet.

When the anode includes the anode support and the anode functional layer, the thickness of the anode support may be 350 μm or more and 1000 μm or less, and the thickness of the anode functional layer may be 5 μm or more and 50 μm or less.

A contact area between the electrolyte and the anode may be about 100% based on the entire area of one side facing the anode of the surface of the electrolyte. At this time, there may be some errors in the process, but theoretically, the contact area between the electrolyte and the anode may be 100% based on the entire area of one side facing the anode of the surface of the electrolyte.

At one side facing the cathode thick film layer of the surface of the cathode thin film layer, a part or all of a portion which does not contact the cathode thick film layer may contact a sealing layer sealing the solid oxide fuel cell.

A contact area between the cathode thin film layer and the sealing layer may be 3% or more and 20% or less based on the entire area of one side facing the cathode thick film layer of the surface of the cathode thin film layer.

On one side facing the cathode thick film layer of the surface of the cathode thin film layer, the cathode thick film layer and the sealing layer may be spaced apart from each other.

In the present specification, the green sheet means a film-like membrane which may be processed in a next process other than a complete end product. In other words, the green sheet is coated with a coating composition containing the inorganic particles and the solvent and then dried in a sheet form and means a semi-dried sheet capable of maintaining a sheet form while including a small amount of solvent.

The form of the fuel cell is not limited, and for example, may be a coin type, a plate type, a cylinder type, a horn type, a button type, a sheet type, or a laminated type.

The fuel cell may be particularly used as power of an electric vehicle, a hybrid electric vehicle, a plug-in hybrid electric vehicle or a power storage device.

The present specification provides a cell module including the solid oxide fuel cell as a unit cell.

FIG. 2 schematically illustrates an embodiment of a battery module including a fuel cell, and the fuel cell includes a battery module 60, an oxidizer supply unit 70, and a fuel supply unit 80.

The battery module 60 includes one or more fuel cells described above as unit cells, and includes separators interposed between the unit cells when two or more unit cells are included. The separator serves to prevent the unit cells from being electrically connected to each other and transmit the fuel and the oxidizer supplied from the outside to the unit cells.

The oxidizer supply unit 70 serves to supply the oxidizer to the battery module 60. As the oxidizer, oxygen is representatively used, and oxygen or air which is injected into the oxidizer supply unit 70 may be used.

The fuel supply unit 80 serves to supply the fuel to the battery module 60 and includes a fuel tank 81 storing the fuel and a pump 82 supplying the fuel stored in the fuel tank 81 to the battery module 60. As the fuel, gas or liquid hydrogen or hydrocarbon fuel may be used. Examples of the hydrocarbon fuel may include methanol, ethanol, propanol, butanol or natural gas.

Hereinafter, the present specification will be described in more detail through Examples. However, the following Examples are just to exemplify the present specification and the present specification is not limited thereto.

Example

Eight fuel electrode (anode) support (GDC/NiO) green sheets having a thickness of 120 μm were laminated and one fuel electrode (anode) functional layer (GDC/NiO) green sheet having a thickness of 50 μm and two GDC electrolyte green sheets having a thickness of 15 μm were laminated thereon to prepare a laminate. After the laminate was cut, sintering was performed on a porous ceramic setter for 3 hours at a final temperature of 1500° C. At this time, the thickness of the anode support after sintering was 700 to 750 μm, the thickness of the anode functional layer was 30 to 40 μm, and the thickness of the GDC electrolyte layer was 23 μm.

A cathode thin film layer was formed on the entire surface of the sintered GDC electrolyte layer by sputtering and then fired at 1200° C. for 3 hours to form a dense film, thereby fabricating an SOFC cell. A cathode thick film layer was formed on the fired cathode thin film layer by sputtering and then fired at 1050° C. for 2 hours to obtain a porous film. The thickness of the fired cathode thin film layer was 30 nm, the porosity was less than 0.1%, and the thickness of the fired cathode thick film layer was 30 μm.

In this case, the area of the GDC electrolyte layer was 9 $mm^2$ (3 mm×3 mm), the area of the cathode thin film layer was 9 $mm^2$ (3 mm×3 mm), and the area of the cathode thick film layer was 7.29 $mm^2$ (2.7 mm×2.7 mm). As a result, based on the area (9 $mm^2$) of the GDC electrolyte layer, the contact area (9 $mm^2$) between the electrolyte layer and the cathode thin film layer was about 100%, and based on the area (9 $mm^2$) of the cathode thin film layer, the contact area (7.29 $mm^2$) between the cathode thin film layer and the cathode thick film layer was about 81%.

Comparative Example

An SOFC cell was prepared in the same manner as Example except that the cathode thick film layer in Example was directly formed on the GDC electrolyte layer without the cathode thin film layer. The thickness of the fired cathode thick film layer was 30 μm.

In this case, the area of the GDC electrolyte layer was 9 $mm^2$ (3 mm×3 mm) and the area of the cathode thick film layer was 7.29 $mm^2$ (2.7 mm×2.7 mm). As a result, based on the area (9 $mm^2$) of the GDC electrolyte layer, the contact area (7.29 $mm^2$) between the electrolyte layer and the cathode thick film layer was about 81%.

Experimental Example

Open circuit voltage (OCV) characteristics of Example and Comparative Example were analyzed by varying a hydrogen flow rate of the cell to 2.5 cc/$cm^2$ to 125 cc/$cm^2$ per unit area. The results were illustrated in FIG. 5 (Comparative Example) and FIG. 6 (Example).

Whether the cathode thin film layer of Example deposited on the entire surface of the electrolyte may prevent reduction for hydrogen was confirmed through the OCV analysis. Particularly, in Comparative Example without the cathode thin film layer, it can be seen that the OCV decreases as the hydrogen flow rate increases, but in Example with the cathode thin film layer, it can be seen that the OCV does not decrease or rather increases as the hydrogen flow rate increases. That is, in Example with the cathode thin film layer, it can be seen that the durability of the hydrogen reduction of the GDC electrolyte is improved.

The invention claimed is:

1. An anode support type solid oxide fuel cell in which, comprising:
    an anode support, an anode functional layer, an electrolyte, and a cathode sequentially provided,
    wherein
    the electrolyte includes ceria-based metal oxide,
    the cathode includes a cathode thin film layer provided on the electrolyte and a cathode thick film layer provided on the cathode thin film layer,
    the thickness of the cathode thin film layer is less than 50 nm, the porosity of the cathode thin film layer is 1% or less,
    the thickness of the cathode thick film layer is 20 μm or more and 40 μm or less, the porosity of the cathode thick film layer is 30% or more,
    a contact area between the electrolyte and the cathode thin film layer is about 100% based on the entire area of one side facing the cathode thin film layer of the surface of the electrolyte, and
    a contact area between the cathode thin film layer and the cathode thick film layer is 80% or more and 97% or less based on the entire area of one side facing the cathode thick film layer of the surface of the cathode thin film layer.

2. The anode support type solid oxide fuel cell of claim 1, further comprising a sealing layer sealing the solid oxide fuel cell, wherein on the one side facing the cathode thick film layer of the surface of the cathode thin film layer, a part or all of a portion of the cathode thin film layer which does not contact the cathode thick film layer contacts the sealing layer, and
    a contact area between the cathode thin film layer and the sealing layer is 3% or more and 20% or less based on the entire area of the one side facing the cathode thick film layer of the surface of the cathode thin film layer.

3. The anode support type solid oxide fuel cell of claim 2, wherein on the one side facing the cathode thick film layer of the surface of the cathode thin film layer, the cathode thick film layer and the sealing layer are spaced apart from each other.

4. The anode support type solid oxide fuel cell of claim 1, wherein the ceria-based metal oxide includes at least one selected from the group consisting of samarium doped ceria and gadolinium doped ceria.

5. The anode support type solid oxide fuel cell of claim 1, wherein based on the entire area of one side facing the anode functional layer of the surface of the electrolyte, a contact area between the electrolyte and the anode functional layer is about 100%.

6. A battery module including the solid oxide fuel cell of claim 1 as a unit cell.

\* \* \* \* \*